United States Patent
Pekin et al.

(10) Patent No.: US 10,053,922 B2
(45) Date of Patent: Aug. 21, 2018

(54) SEALED THREADED JOINT FOR TUBING PIPES

(71) Applicant: TMK-PREMIUM SERVICES LLC, Moscow (RU)

(72) Inventors: Sergey Alexandrovich Pekin, Moscow (RU); Boris Urievich Shcherbakov, Taganrog (RU); Yury Fedorovich Emelianov, Taganrog (RU); Vladimir Petrovich Aldohin, Moscow (RU); Pavel Nikolaevich Sidorenko, Taganrog (RU); Denis Viktorovich Nikiforov, v. Petrushino (RU); Pavel Konstantinovich Ponomarenko, Taganrog (RU)

(73) Assignee: TMK-PREMIUM SERVICES LLC, Moscow (RU)

( * ) Notice: Subject to any disclaimer, the term of this patent is extended or adjusted under 35 U.S.C. 154(b) by 0 days.

(21) Appl. No.: 14/415,738

(22) PCT Filed: Jul. 16, 2013

(86) PCT No.: PCT/RU2013/000608
§ 371 (c)(1),
(2) Date: Jan. 20, 2015

(87) PCT Pub. No.: WO2014/014391
PCT Pub. Date: Jan. 23, 2014

(65) Prior Publication Data
US 2015/0191980 A1    Jul. 9, 2015

(30) Foreign Application Priority Data

Jul. 20, 2012 (RU) ................... 2012131066

(51) Int. Cl.
*E21B 17/042* (2006.01)
*F16L 15/00* (2006.01)
*F16L 15/06* (2006.01)

(52) U.S. Cl.
CPC .......... *E21B 17/042* (2013.01); *F16L 15/004* (2013.01); *F16L 15/06* (2013.01)

(58) Field of Classification Search
CPC ......... F16L 15/00; F16L 15/06; F16L 15/004; E21B 17/02; E21B 17/08; E21B 17/085; E21B 17/042
(Continued)

(56) References Cited

U.S. PATENT DOCUMENTS

2003/0234538 A1* 12/2003 Hashem .................. 285/333
2004/0262919 A1   12/2004 Dutilleul et al.
(Continued)

FOREIGN PATENT DOCUMENTS

FR    2281488 A1    3/1976
WO    2004/109173 A1   12/2004
WO    2006/022418 A1    3/2006

*Primary Examiner* — Greg Binda
*Assistant Examiner* — Zachary T Dragicevich
(74) *Attorney, Agent, or Firm* — John Alumit

(57) ABSTRACT

A joint for pipes includes male and female portions, trapezoidal threads at taper sealing and bearing end surfaces, with slope angles between thread lead-in flanks and the thread axis normal line of 10-24° and between load flanks and the thread axis normal line of −4° to +5°. The bearing end surfaces have a 10-20° slope angle from the thread axis normal line. There is 13-18° slope angle between the male portion sealing surface and thread axis normal line, and an 8-12° slope angle between the female portion sealing surface and thread axis normal line. The female portion thread run-out area and mating areas of the sealing and the bearing end surfaces have circumferential grooves. The female ele-
(Continued)

ment sealing surface and circumferential groove surface and the male portion sealing surface and thread run-out surface are rounded.

10 Claims, 3 Drawing Sheets

(58) Field of Classification Search
USPC .................................................. 285/333, 334
See application file for complete search history.

(56) References Cited

U.S. PATENT DOCUMENTS

| | | |
|---|---|---|
| 2005/0248153 A1* | 11/2005 | Sugino et al. ................ 285/333 |
| 2010/0270793 A1* | 10/2010 | Takano et al. ................ 285/333 |
| 2010/0301603 A1 | 12/2010 | Beigneux et al. |
| 2013/0147191 A1* | 6/2013 | Mazzaferro et al. ......... 285/390 |
| 2013/0181442 A1* | 7/2013 | Sonobe et al. ................ 285/333 |

* cited by examiner

SEALED THREADED JOINT FOR TUBING PIPES

RELATED APPLICATIONS

This application claims priority to PCT application no. PCT/RU2013/000608 (publication no. WO 2014/014391), filed 16 Jul. 2013, which claims priority to Russian patent application no. 2012131066, filed 20 Jul. 2012.

BACKGROUND

The present invention refers to sealed threaded joints for tubing pipes which can be used for joining of the string elements, used at oil and gas wells exploitation, used for transportation of liquid and gaseous substances, as well as for overhaul and tripping operation.

The tubing in oil and gas wells is exploited in adverse conditions, in corrosive media and under huge mechanical loads. Therefore, the general requirements for such tubing pipes includes high corrosion resistance, wear resistance, preservation of tightness at high loads, as well as high strength to provide passing ability in wells, especially in curved areas.

Currently in the state of the art there is a known sealed threaded joint for tubing pipes, which consists of male and female elements, the ends of which, both externally and internally, are produced with corresponding tapered trapezoidal threads, and that contact each other's tapered sealing and bearing end surfaces to create an internal sealing unit (RU 74661 U1, E21B 17/042. 10.07.2008).

The state of the art joint has the following shortcoming: loosening of the joint at a high combined mechanical load (e.g., in applications involving tension and bending).

The shortcomings of the current art are solved by the claimed invention by developing a sealed threaded joint for tubing pipes that can be applied for joining of gas and oil well string elements, operated at high loads.

SUMMARY

The present invention preserves a high degree of tightness in a joint being affected by a high mechanical combined load (e.g., tension and bending), including preservation of wear resistance of the connection at multiple make-up and brake-out procedures and during operation.

The result is achieved by the presence of male and female elements of the sealed threaded joint for tubing pipes, the ends of which, both externally and internally, are produced correspondingly with tapered trapezoidal threads, and contacting each other's tapered sealing and bearing end surfaces, which make an internal sealing unit. The bearing end surfaces make an acute angle with the corresponding sealing surfaces. The thread profile of the male and female elements at the area of mating of the load flank and the crest, as well as at the area of mating of the lead-in flank and the crest, is rounded. The profile crests and lead-in flanks of the male and female elements are made in such a way as to provide gaps in between them when making-up the joint. The female element of the joint has a circumferential groove at the area where the thread runs out, and a circumferential groove at the area where the sealing surface and the bearing end surface mate. The area where the sealing surface and the circumferential groove surface of the female element and the area where the sealing surface meets the area where the thread runs out on the male element are rounded. A slope angle between the sealing surface of the male element and the thread axis line is between 13-18°, and a slope angle of the sealing surface of the female element is between 8-12°.

The bearing end surfaces of the internal sealing unit can have a slope angle with the thread axis normal line equal to 10-20°. The radii of the rounded areas on the area where the sealing surface mates with the circumferential groove surface of the female element and the area where the sealing surface meets the area where the thread runs out on the male element can reach between 4-10 mm.

The circumferential groove surface of the female element can be a direct extension of the female element sealing surface.

The circumferential groove surface produces at making-up a hollow, which covers the first one-and-a-half thread turns of the male element.

At an area where the load flank meets the thread profile crest and at an area where the lead-in flank meets the thread profile crest, the radii of the rounded areas of the thread profile of the male element are bigger than the corresponding radii of the rounded areas of the thread profile of the female element.

The radius of the rounded areas of the thread profile where the load flank meets the thread profile crest of the male element can come up to 0.2 mm (on the female element to 0.1 mm). The radius of the rounded area of the thread profile where the lead-in flank meets the thread profile crest of the male element can come up to 0.5 mm (on the female element to 0.2 mm.

The slope angle between the thread profile lead-in flank of both female and male elements and the thread axis normal line can be from 10-24°, and a slope angle of the thread profile load flank can vary from or −4 to +50, relative to the thread axis normal line.

The thread profile crests of both male and female elements can be produced in such a way as to form between them a gap of 0.05-0.15 mm wide at the making-up of the joint.

The thread profile lead-in flanks of both male and female elements can be produced in such a way as to form between them a gap of 0.05-0.15 mm wide at the making-up of the joint.

Trapezoidal threads of both male and female elements can be produced with a 1:16 taper.

DETAILED DESCRIPTION

Figure 1:
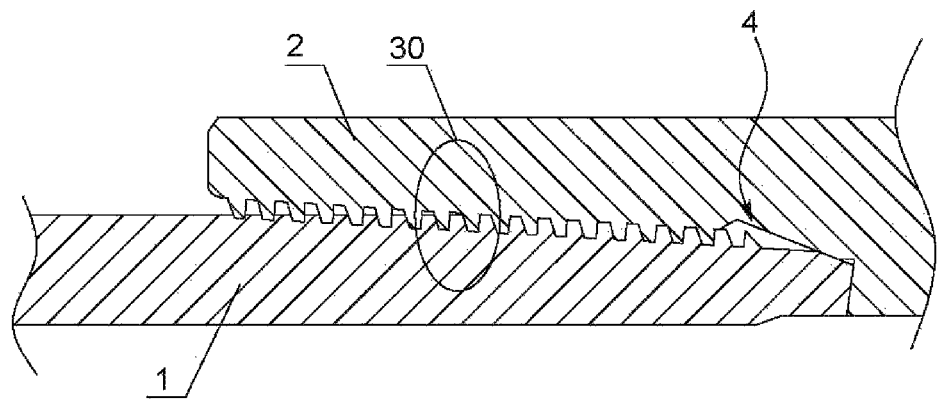
FIG. 1 depicts a made-up sealed threaded joint for tubing pipes.
Figure 2:
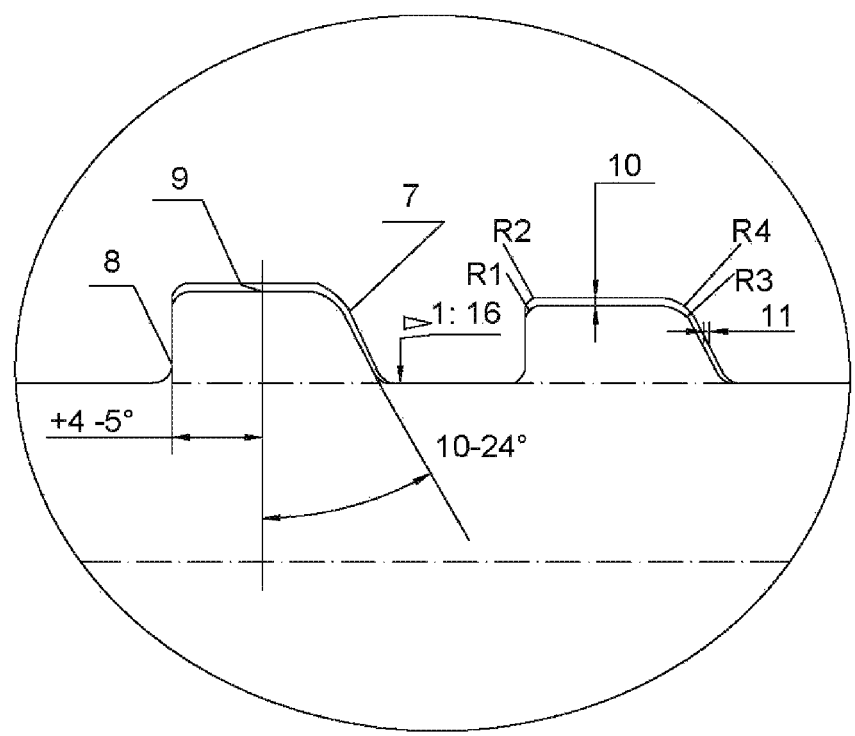
FIG. 2 depicts the profile of the tapered trapezoidal thread used for the sealed threaded joint for tubing pipes.
Figure 3:
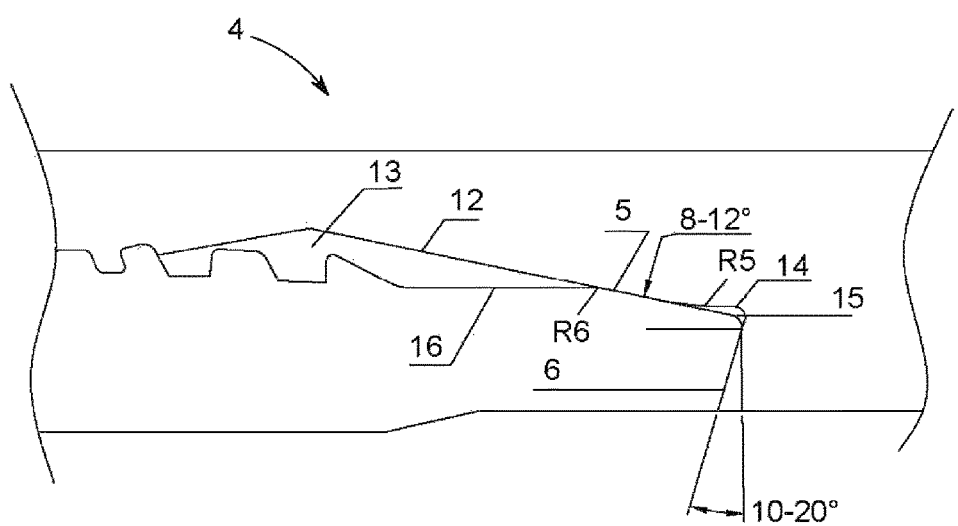
FIG. 3 depicts an internal sealing unit of the sealed threaded joint for tubing pipes.

Referring to FIGS. 1-3, the sealed threaded joint for tubing pipes consists of the male element (1), and the female element (2), the ends of which, both externally and internally, correspondingly, are produced with tapered trapezoidal threads (3) and include sealing (5) and bearing end (6) surfaces, which make an internal sealing unit (4).

The male element (1) can be produced either in the form of a tube, pipe or a pin, and the female element (2) in the form of a box or a coupling.

The thread profile (3) is made in the form of an uneven-sided trapezoid, the sides of which are the load (8) flank and the lead-in (7) flank. The above specified form of the thread profile lets the thread endure sufficient tension and for easy make-up of the joint (e.g., prevents the joint from jamming during make-up).

The thread profile (3) of the male (1) and female (2) elements can be made with a slope angle between the lead-in (7) flank and thread axis normal line, equal to 10-24° and with a slope angle between the load (8) flank and thread axis normal line equal to −4 to +5°.

The thread axis normal line is a perpendicular line to the thread axis line.

Producing a 10-24° slope angle between the lead-in (7) thread flank and the thread axis normal line provides stabilization of the male (1) element's location relative to the female (2) element at the beginning of any make-up procedure, which prevents the joint from jamming and avoids damaging the thread (e.g., by galling). Besides that, it provides the possibility for multiple make-ups and brake-outs of the joint and while maintaining high tightness.

Producing of a slope angle of the thread load (8) flank equal to −4 to +50 relative to the thread axis normal line prevents cross-threading under tension (i.e., tightness loss), when tension is applied to the joint below the string run under its own weight.

When the joint is assembled (i.e., is operational), the thread profile (3) crests (9) produced on the outer surface of the male (1) element and on the inner surface of the female (2) element, make a gap (10) between each other. Another gap (11) is produced by lead-in (7) flanks of the thread profile (3), produced on both the male (1) and female (2) elements of the thread joint.

The gap (10) between the thread profile (3) crests (9) of the male (1) and female (2) elements provides for improved make-up of the joint and for its improved wear resistance, as well as letting out excess dope during make-up of the joint, the accumulation of which on the contacting surfaces of the joint reduces its tightness.

A gap (11) between the lead-in (7) flanks of the thread profile (3) provides for the possibility of multiple make-ups and brake-outs of the thread joint without loss of its performance features (its high tightness, in particular) and its working efficiency. Besides that, a prevention from galling in the presence of foreign particles between the lead-in (7) flanks of the thread profile (3) on the male (1) and female (2) elements.

In particular, the width of the gap (10) between the tapered trapezoidal thread profile (3) crests (9) on the male (1) and female (2) elements can be 0.05-0.15 mm, and the width of the gap (11) between leading (7) flanks of the thread profile (3) can be 0.05-0.15 mm.

The thread profile (3) on the external surface of the male (1) element and on the internal surface of female (2) elements at the area of mating of the load (8) flank and the crest (9), as well as at the mating area of the lead-in (7) flank and the crest (9) is produced rounded.

And for both the area of mating of the load (8) flank and the thread profile crest (9) and for the area of mating of the lead-in (7) flank and thread profile crest (9), the radii (Rb, R2) of the abovementioned rounded portion of the thread profile on the male (1) element are bigger than the corresponding radii (R2, R) on the female (2) element—R>R2 H R3>R4.

In particular, the radius of the rounded portion of the thread profile at the area of mating of the load (8) flank and the crest (9) on the male (1) element can come up to 0.2 mm; while on the female (2) element it can be 0.1 mm. The radius of the rounded portion of the thread profile at the area where the lead-in (7) flank and the crest (9) on the male (1) element mate can come up to 0.5 mm; and on the female (2) element it can be 0.2 mm.

The "rounding radius" is the radius of a circumference tangent to the load (8) flank and to the thread profile crest (9) or tangent to the lead-in (7) flank and to the thread profile crest (9).

Making the rounding radius R1 at the mating area of the load (8) flank and thread profile crest (9) of the male (1) element bigger than that of R2 of the female (2) element provides a guaranteed contact on the straightline area of the thread profile (3) load (8) flank of the male (1) and female (2) elements during making-up of a connection for increasing the thread elements' resistance to wear during joint operation.

By making the rounding radius R3 at the mating area of the lead-in (7) flank and thread profile crest (9) of the male (1) element bigger than that R4 of the female (2) element, the joint is prevented from jamming at the beginning of make-up and prevents the thread surface from damage by galling.

Trapezoidal threads (3) on the external surface of the male (1) element and on the internal surface of the female (2) element are produced tapered.

Having the threads (3) tapered provides for a high level of tooth action when made-up and allows it to perform under high tension loads.

Trapezoidal threads (3) may have taper of 1:16.

Producing the threads (3) on the male (1) and female (2) elements with a 1:16 taper provides the optimal ability of the joint to handle bending and tensile loads during operation and during construction of the tubing string.

The internal sealing unit (4) of the joint is formed by contacting taper sealing (5) and bearing end (6) surfaces produced on the ends of the male (1) element external surface and female (2) element internal surface.

During make-up of the joint, when the tapers contact each other the taper sealing (5) and bearing end (6) surfaces due to elastic strain establish a thread or seal interference and "metal-to-metal" sealing and provide high tightness for the whole construction (i.e., the joint) under complex loads and in severe service areas (such as in a corrosive medium).

The bearing end (6) surfaces, produced on the male (1) element external surface and on the female (2) element internal surfaces, make an acute angle with the corresponding sealing (5) surfaces of the male (1) and female (2) elements.

The specified slope angle of the bearing end (6) surfaces provides additional "contraction" of the sealing unit, which permits it to reduce the radial interference and consequently, reduces the possibility of the sealing (5) surfaces being damaged and from galling occurring on them. Besides that the contact area of bearing end (6) surfaces of the male (1) and female (2) elements increases due to its production on-the-mitre to the thread axis normal line, which permits increased make-up torque to preserve contact stresses on a sufficient level within elastic strain.

In particular, the bearing end (6) surfaces may be produced with a 10-20° slope angle to thread axis normal line.

In case the abovementioned slope angle between the bearing end (6) surface and the thread axis normal line exceeds the specified level, sufficient female (2) element inner diameter strain at compression, or exceeds make-up of the joint start to occur. In case the slope angle is below the specified level—the "wedge effect" is lost as the female (2) element wedge becomes stiffer along the axis.

The sealing (5) surfaces of the internal sealing unit (4) of the joint, produced on the external surface of the male (1) element and on the internal surface of the female (2) element are not parallel to each other. The male (1) element sealing surface (5) slope angle to the thread axis line is bigger than that of the female (2) element.

The specified mutual location of the sealing surfaces (5) of the male (1) and female (2) elements provides high level contact stresses in the most distant from bearing end (6) surfaces area, which provides high tightness of the joint at combinations of various limit loads.

The specified mutual location of the sealing surfaces (5) of the male (1) and female (2) elements also provides its optimal contact area and a high level of contact stresses for the sealing surfaces (5) of the male (1) and female (2) elements, which consequently provides high tightness of the joint at all combinations of loads within all tolerance zones of the male (1) and female (2) elements.

The slope angle between the sealing surface (5) and the thread axial line of the male (1) element is 13-180°, and between the female (2) element, 8-12°.

The area of mating (R5) of the sealing surface (5) and the circumferential groove (14) of the female (2) element is rounded. The area of mating (R6) of the sealing surface (5) and the thread run-out surface (16) of the female (2) element is also rounded.

The specified rounded areas increase the contact area of the sealing surfaces (5) of the male (1) and female (2) elements, which has an influence on joint tightness. Additionally, the specified rounded areas permit the joint to operate well under bending forces, preserving high joint tightness under bending loads.

In particular, the rounded radii on the area of mating of the sealing surface (5) and circumferential groove (14) surface of the female (2) element (5) and on the area of mating of the sealing surface (5) and the thread run-out surface (16) of the female (2) element 3/4 can come up to 4-10 mm.

On the joint female (2) element, on the area where the thread runs out, there is a circumferential groove (12) that makes a hollow (13), covering the first one-and-a-half thread turns on the male (1) element. The specified hollow (13) is limited (see the side view of the joint section) by the first one-and-a-half thread turns on the male (1) element, the surface of the circumferential groove (12) on the female (2) element, the sealing surfaces (5) on the male (1) and female (2) elements and by the load (8) flanks of the thread profile on the male (1) and female (2) elements.

Producing the specified circumferential groove (12), as specified above, prevents damage to the first imperfect thread (3) turn of the male (1) element at the beginning of joint make-up with the application of increased make-up torque. The hollow (13) made by the circumferential groove (12) serves for letting out the excess dope during the make-up process, which excludes the excess dope pressure on the joint and the tightness loss during yawn of the joint elements to each other as a result of excess dope.

The presence of the circumferential groove (12) on the female (2) element and on the hollow made by it (13) of the specified size permits threading of the male (1) element without changing the motion path of the cutting instrument at the end of the thread, which provides the accurate positioning of the male (1) element relative to the female (2) element due to accurately matching the bearing end (6) surfaces during joint make-up.

The circumference groove (12) surface of the female (2) element is the direct extension of the sealing (5) surface of the female (2) element. The specified manufacture of the circumferential groove (12) surface and sealing (5) surface straightly, without angles and chamfering, provides for a smooth exit of the cutting instrument with no damage to the thread, which will further provide high joint tightness in a made-up state.

There is a circumferential groove (14) on the area of mating of sealing surface (5) and bearing end (6) surface on the female (2) element. The groove (14) makes a hollow (15), and it is limited by (see the thread joint section side view) the bearing end (6) surfaces and the sealing surfaces (5) of the male (1) and female (2) elements, as well as by the groove (14) surface on the female (2) element.

The hollow (15), made by the groove (14) is used for pushing out the excess dope from the bearing end (6) surfaces during making-up of the joint. Besides that, a contact of male (1) and female (2) elements is excluded on the area of the groove (14) location. It prevents taper sealing (5) surfaces from pressing out when the joint is under torque.

Location of the sealing (5) surfaces at a definite distance from the bearing end (6) surfaces prevents the internal sealing unit (4) from the effects of strain that occur on the bearing end (6) surfaces when the joint is under torque. The specified location of the contacting sealing surfaces (5) minimizes damage to the surfaces (5) during production and operation of the joint.

The presence of the circumferential grooves (12) and (14) on the sealing surfaces (5) edges prevents the internal sealing unit (4) from the dope excesses effect, at it the dope excess is pushed out into the hollow (13) made by the groove (12) and by the male (1) element. The dope excess from the bearing end (6) surfaces are pushed out into the hollow (15) made by the circumferential groove (14) and the male (1) element.

The structure of the sealed threaded joint having been shown and described, a discussion of its operation follows.

The first step during the make-up process is to perform interaction of the male (1) and female (2) elements of the joint with the help of the tapered trapezoidal threads (3) produced on the ends on the external surface of the male (1) element and internal surface of the female (2) element.

During the make-up process forward movement of the sealing surface (5) of the male (1) element along the circumferential groove (12) of the female (2) element takes place. After that the sealing surface (5) of the male (1) element interacts with the sealing surface (5) of the female (2) element. Due to diametric strains of the tapered sealing surfaces (5) a "metal-to-metal" sealing is created.

The joint make-up process is complete, when moving the male (1) and female (2) elements relative to each other, occurs with pressurized contact of the bearing end (6) surfaces produced on the male (1) and female (2) elements which results in the appearance of contact stresses in the bearing end (6) surfaces, the values of which are within elastic strains range.

The bearing end (6) surfaces are produced in such a way, that when they are affected by the axial load occurring during joint make-up, the transversal constituent of the specified axial load is directed to the joint axis. This excludes so-called "unrolling" effect. The transversal strain followed by the diameter increase in the area of bearing end (6) surfaces, makes the joint less sensitive to exceeded make-up torque and increases the joint operational reliability.

An example embodiment of the invention is as follows.

A sealed threaded joint for tubing pipes consists of the male (1) and female (2) elements, on the corresponding internal and external surfaces of which there are produced tapered trapezoidal threads (3), and contacting each other taper sealing (5) and bearing end (6) surfaces, which make an internal sealing unit (4) of the joint.

The thread profile (3) of the internal and external surfaces of the male (1) and female (2) elements, correspondingly, is produced with the slope angle between the lead-in (7) flank and the thread axis normal line, equal to 18° and with the slope angle between the load (8) flank and the thread axis normal line, equal to 1°. The thread taper is 1:16, pitch—4.233 mm.

The width of the gap (10) between the thread (3) profile crests (9) on the male (1) and the female (2) elements and of the gap (11) between the lead-in (7) flanks of the thread (3) profile amounts to 0.1 mm.

The radius of the rounded portion of the thread (3) profile at the area of mating of the load (8) flank and the crest (9) on the male (1) element can come up to 0.2 mm; and on the female (2) element 0.1 mm. The radius of the rounded area of the thread profile at the area of mating of the lead-in (7) flank and the crest (9) on the male (1) element can come up to 0.5 mm; and on the female (2) element 0.2 mm.

The bearing end (6) surfaces produced on the external and internal surfaces of the male (1) and female (2) elements correspondingly, make an acute angle with the sealing surfaces (5) and are tilted to the thread axis normal line under 15° angle.

The slope angle between the sealing (5) surface and the thread axis line of the male (1) element amounts to 140, and of the female (2) element 12°.

The female (2) element of the thread joint at the area where the thread runs out contains a circumferential groove (12), which makes a hollow (13) and covers the first one and a half thread turns of the male (1) element.

The circumferential groove (12) surface of the female (2) element is the direct extension of the sealing surface (5) of the female (2) element.

The circumferential groove (14), making a hollow (15) is produced on the female (2) element, on the area of mating of the taper sealing surface (5) and bearing end (6) surface.

The rounded radii on the area of mating of female (2) element sealing surface (5) and circumferential groove (14) surface and on the area of mating of the male (1) element sealing surface (5) and the groove (12) surface amount to 5 mm.

The given thread joint provides the joint with increased tightness, with increased wear resistance of the joint during its multiple make-ups and brake-outs and during operation, while enduring high tensile loads, as well as the ease of joint inspection, which allows use of the joint for drilling string elements for both fluid and gas.

The invention claimed is:

1. A sealed threaded joint for gas and petroleum pipes comprising a male portion having a male opening and a complementary female portion having a female opening, the joint comprising:
    complementary tapered trapezoidal threads on the male portion and on the female portion, the trapezoidal threads each having a lead-in portion, a crest, and a load portion, the trapezoidal threads together defining a thread axis;
    a gap above each of the crests;
    a first circumferential groove on the female portion adjacent the trapezoidal threads and distal from the female opening;
    a second circumferential groove on the female portion adjacent a terminal end of the male portion;
    wherein the female portion comprises a slope angle between the first circumferential groove and the second circumferential groove of between 8 and 12 degrees from the thread axis, and the male portion comprises a slope angle between the first circumferential groove and the second circumferential groove of between 13 and 18 degrees from the thread axis, thereby ensuring an incline angle of a sealing surface of the male component is always greater than an incline angle of a sealing surface of the female component;
    having a peak of the profile of the thread turn of the female portion and a peak of the profile of the thread turn of the male portion forms a gap of between 0.05 and 0.15 millimeters when the female portion and the male portion are fully engaged,
    a mating surface area of the sealing surface and the second circumferential groove of the female portion is rounded, and a mating surface area of the sealing surface and a thread run-out surface of the female portion is also rounded, so that the radii of said rounded mating surface areas are between 4-10 mm; and
    the second circumferential groove forms a rounded hollow on the female portion, on an area of mating of the sealing surface and a bearing end surface.

2. The joint of claim 1 wherein the male portion comprises an end surface, the end surface disposed at an angle of 10 to 20 degrees from a normal line to the thread axis.

3. The joint of claim 1 wherein the first circumferential groove forms a hollow covering one and a half thread turns of the male portion.

4. The joint of claim 1 wherein the first circumferential groove is partially formed at the female portion slope angle.

5. The joint of claim 1 wherein the lead-in portion of the trapezoidal threads is 10 to 24 degrees from a normal line to the thread axis, and the load portion of the trapezoidal threads is −4 to 5 degrees from a normal line to the thread axis.

6. The joint of claim 1, further comprising second gaps of between 0.05 and 0.15 millimeters above each lead-in portion of the trapezoidal threads.

7. The joint of claim 1 wherein the trapezoidal threads each comprise a rounded portion between the lead-in portion and the crest, and a rounded portion between the crest and the load portion.

8. The joint of claim 7 wherein the rounded portion between each lead-in portion and each crest is 0.2 millimeters, and the rounded portion between each crest and each load portion is 0.1 millimeters.

9. The joint according to claim 7 wherein the rounded portion between each lead-in portion and each crest is 0.5 millimeters, and the rounded portion between each crest and each load portion is 0.2 millimeters.

10. The joint of claim 1 wherein the trapezoidal threads on the male portion have a 1:16 taper.

* * * * *